Jan. 15, 1974  TETSUYA TAKAMATSU ET AL  3,786,103
METHOD FOR REMOVING A SMALL AMOUNT OF COMPONENTS FROM A HIGHLY
VISCOUS POLYMER SOLUTION CONTAINING SAID
COMPONENTS AND AN APPARATUS THEREFOR
Filed July 2, 1971

3,786,103
METHOD FOR REMOVING A SMALL AMOUNT OF COMPONENTS FROM A HIGHLY VISCOUS POLYMER SOLUTION CONTAINING SAID COMPONENTS AND AN APPARATUS THEREFOR
Tetsuya Takamatsu, Toshio Yoshimoto, Tsuneaki Narumiya, Hiroshi Yoshii, and Tsuneo Wakamatsu, Tokyo, Saburo Fukui, Hiroshima, Hikokusu Kajimoto, Akimachi, and Yoichi Kawai, Yoshinori Inaba, and Katsuyoshi Usui, Hiroshima, Japan, assignors to Bridgestone Tire Company Limited and Mitsubishi Jukogyo Kabushiki Kaisha, both of Tokyo, Japan
Filed July 2, 1971, Ser. No. 159,395
Claims priority, application Japan, July 6, 1970, 45/58,542
Int. Cl. C08d 5/00
U.S. Cl. 260—683.15 R          2 Claims

ABSTRACT OF THE DISCLOSURE

A small amount of impurities contained in a solution of a high molecular weight substance having a high viscosity is dissolved and removed by contacting said solution with an extracting liquid of a solution having a low viscosity by using a horizontal cylindrical treating vessel provided with two rotary driving shafts parallel to the longitudinal direction of said vessel which rotate in the reverse direction with each other, each of said driving shafts being provided with a plurality of rotary members so that the rotary members on the two driving shafts are overlapped at a given distance without contacting with each other and a partition wall having an opening around and near the driving shaft provided in the vicinity of the last rotary member in the outlet side of the highly viscous solution. The highly viscous solution is stirred while being retained between the rotary members and immersed in the low viscous solution and only the highly viscous solution treated with the low viscous solution is discharged through the opening of the partition wall.

---

The present invention relates to a method for dissolving and removing a small amount of components contained in a solution of a high molecular weight polymer having a high viscosity (referred to as "highly viscous polymer solution" hereinafter) by a liquid-liquid contact of said highly viscous solution with a solution having a low viscosity and a poor solubility in the highly viscous solution (referred to as "low viscous solution" hereinafter) and an apparatus therefor and particularly a novel continuous method for dissolving and removing impurities of a relatively small amount contained in the highly viscous high polymer solution, such as a catalyst residue, a molecular weight regulator, an additive, a by-product, an unreacted substance and soluble impurities admixed in said highly viscous solution during synthesis or modification of synthetic rubber, natural rubber, synthetic resin, synthetic fiber and natural fiber by contacting said highly viscous solution with the low viscous solution and the apparatus therefor.

When a small amount of impurities contained in a highly viscous polymer solution, which has been formed during the synthesis or modification of the high molecular weight polymer, has not been removed, the impurities-containing high molecular weight polymer causes difficulties in the after treatments, such as vulcanization, dying, molding and the like and in the resulting product these impurities promote the deterioration and aging and bring about the coloration and discoloration. For example, it has been well known that Ziegler catalyst remaining in polyolefin obtained by the polymerization by means of said catalyst promotes the deterioration of the polyolefin. Consequently, it is a very important problem in industry to remove such a relatively small amount of impurities contained in the high polymer solution.

As the process for removing these impurities from the high polymer solution, a liquid-liquid extractor, for example, mixer settler has heretofore used, but such a previous apparatus has been developed as an extractor between both the liquids having low viscosities and consequently when such an extractor is used for the liquid-liquid extraction between a solution of a high viscosity and a solution of a low viscosity as in the removal of impurities from the highly viscous high polymer solution, it is difficult to transfer the shearing force between both the liquids and to make drops of the highly viscous solution fine. Furthermore, the highly viscous solution has a large fluid resistance and consequently the chance of the liquid-liquid contact in the highly viscous solution side is uneven, so that in most cases the extraction rate is slow. Furthermore, when the stirring rate is increased in the apparatus carrying out a mechanical stirring as in the mixer settler in order to increase the efficiency of contact between both the liquids, the low viscous solution is only dispersed finely into the highly viscous solution and the fine drop-formed low viscous solution is not exchanged and it is difficult to increase the extraction rate between both the liquids.

The inventors have studied to overcome the above discribed difficulty and the present invention has been developed.

The object of the present invention is to provide a method for removing efficiently a small amount of impurities contained in the highly viscous solution, wherein the highly viscous solution is stirred so as not to cause uneven mixing while renewing constantly the surface of the highly viscous solution, which comes into contact with the low viscous solution of an extracting agent, whereby the highly viscous solution and the extracting agent are contacted uniformly as far as possible and the extraction rate is increased and the highly viscous solution having no impurities is taken out from a treating vessel continuously and to provide an apparatus thereof.

Namely, the present invention consists in a method for removing a small amount of components from a highly viscous polymer solution containing said components, which comprises charging the highly viscous polymer solution having a viscosity of not less than 500 centipoises and containing a small amount of components and a low viscous solution having a viscosity of not more than 500 centipoises, which causes a phase separation from said highly viscous solution and has a difference of specific gravity of 0 to 1.3, into a horizontal cylindrical treating vessel continuously, said horizontal vessel being provided with two rotary driving shafts parallel to the longitudinal direction of the horizontal vessel, on each of which a plurality of rotary members are mounted so that the rotary members on both the shafts are overlapped at a given distance but do not come in contact with each other and rotated in the reverse direction, rotating the highly viscous solution while being retained between the rotary members so as not substantially to come in contact with the inner wall of the treating vessel except for only a part of said inner wall in the low viscous solution maintaining such a liquid level that more than ⅕, preferably more than ⅓ of the highly viscous solution is immersed in the low viscous solution, contacting the highly viscous solution with the low viscous solution while renewing the liquid-liquid surface to dissolve and separate the small amount of components in the highly viscous solution into the low viscous solution and discharging the thus treated highly viscous solution from the horizontal treating vessel continuously.

In the present invention, when it is difficult to maintain the liquid level of the low viscous solution in the treating vessel in such a state that more than ⅕, preferably ⅓ of the highly viscous solution is immersed in the low viscous solution, it is preferable to spread or pour the low viscous solution on the surface of the highly viscous solution being stirred while being retained between the rotary members so as not substantially to contact with the inner wall of the cylindrical vessel except for only a part of said inner wall, whereby a small amount of impurities contained in the highly viscous solution is removed.

One of the essential features of the present invention consists in the fact that the high polymer solution is stirred while being retained between the rotary members, and therefore the viscosity of the polymer solution to be applied to the present invention should be not less than 500 centipoises, preferably not less than 1,000 centipoises and if the viscosity is less than 500 centipoises, it is difficult to retain said solution stably between the rotary members, so that the solution of less than 500 centipoises cannot be used in the present invention. Moreover, in order to retain the highly viscous solution between the rotary members stably, it is naturally necessary to separate the highly viscous solution phase from the low viscous solution phase but when the difference of the specific gravity between the highly viscous solution and the low viscous solution exceeds 1.3, the highly viscous solution floats or sinks and the retention of the highly viscous solution between the rotary members is difficult, so that the difference of specific gravity between both the solutions must be not more than 1.3, preferably not more than 0.9. When the viscosity of the low viscous solution charged in the cylindrical vessel is high, the low viscous solution is readily mixed with the highly viscous solution retained between the rotary members and as the result the viscosity of the highly viscous solution is reduced apparently and therefore the highly viscous solution is apt to be separated from the rotary members and further the fluidity of the low viscous solution lowers with the increase of the viscosity, so that in the method of the present invention wherein the highly viscous solution is stirred concentrically while being retained between the rotary members, uneven mixing occurs in the low viscous solution. Therfeore, the viscosity of the low viscous solution to be used in the present invention must be not more than 50 centipoises.

The main reason why the previous apparatus has been difficult to effect efficient and uniform extraction between the highly viscous solution and the low viscous solution, is based on the following fact. When the stirring and mixing of the highly viscous solution having a high fluid resistance and the low viscous solution having a low fluid resistance are effected in a uniform manner, the renewing of the surface between both the liquids becomes uneven, and even if the low viscous solution is dispersed by consuming much larger power than the case in both the low viscous solutions in order to increase the liquid-liquid contact surface area, the exchange of the drops of the low viscous solution in the highly viscous solution is difficult. According to the present invention, the above described problems have been solved by mixing and stirring the highly viscous solution concentrically while being retained between the rotary members.

When the highly viscous solution is stirred while being retained between the rotary members, if the rotary driving shaft provided with the rotary members is only one, the highly viscous solution rotates together with the rotary members and the mixing is uneven and therefore in order to renew the liquid-liquid surface of the highly viscous solution uniformly, it is necessary to rotate the rotary members in the reverse direction with each other in the state that the rotary members are adjacent to each other. Accordingly, a plurality of rotary driving shafts are needed but the structure having three or more rotary driving shafts only makes the apparatus complicated, and the contacting effect of both the liquids is not substantially improved, so that two rotary driving shafts are provided in the present invention. Furthermore, the rotation of the two rotary driving shafts in the reverse direction enables to effect the tearing of the highly viscous solution and the rolling up and incorporating of the low viscous solution simultaneously and consequently the low viscous solution is dispersed into the highly viscous solution uniformly and efficiently and the incorporated low viscous solution drops are released from the highly viscous solution by the tearing function upon the renewing of the surface and hence the low viscous solution dispersed in the highly viscous solution can be efficiently exchanged.

The rotary members to be used in the present invention is merely necessary to have such a structure that these members can retain the highly viscous solution and move said solution towards the outlet while renewing the surfaces of said solution which is exposed to the low viscous solution and for example, discs, roll, paddle, turbine, screw and the modified members thereof may be used but the fine modifications are not valuable, because the effect of such modification disappears due to the fluid resistance of the highly viscous solution. The movement of the highly viscous solution may be effected by the propelling function of the twist of the rotary members themselves or by inclining the rotary driving shaft to utilize the gravity of the moving highly viscous solution. In such a case, for example, the perforated discs are a preferable structure as the rotary members, because they scarcely prevent the overflow.

In the process of the present invention wherein the liquid level of the low viscous solution is maintained in such a state that more than ⅕, preferably more than ⅓ of the highly viscous solution retained between the rotary members is immersed in the low viscous solution, if the liquid level of the low viscous solution is higher than the upper end of the rotary members, when the specific gravity of the highly viscous solution is small and the viscosity of said solution is relatively low, a small part of the highly viscous solution is separated and floats on the liquid level of the low viscous solution and the remixing becomes difficult and therefore in such a case it is preferred to maintain the liquid level of the low viscous solution at a lower position than the upper end of the rotary members.

In order to maintain the liquid level of the low viscous solution properly and to discharge the highly viscous solution continuously from the outlet, it is desired to substantially separate the highly viscous solution from the low viscous solution in the vicinity of the outlet for the highly viscous solution. Since according to the present invention the highly viscous solution is contacted with the low viscous solution while being retained between the rotary members, the separation is difficult in the previous process for separating a light liquid from a heavy liquid. According to the present invention, a partition wall which opens around and near the rotary driving shaft, is provided in the vicinity of the last rotary member in the outlet side of the highly viscous solution, whereby the low viscous solution can be prevented from the discharge through the opening of the partition wall by the highly viscous solution retained between the rotary members and only the highly viscous solution can be moved through said opening into the outlet for the highly viscous solution. By the provision of such a partition wall, the discharge of the highly viscous solution not only becomes feasible, but also the amount of the low viscous solution discharged from the outlet of the low viscous solution is controlled, whereby the liquid level of the low viscous solution can be easily controlled.

The high molecular weight substances to be treated with the method and apparatus of the present invention include synthetic rubbers, natural rubbers, synthetic resins, synthetic fibers, natural fibers, such as polyisobutene, polybutadiene, polyisoprene, ethylene-propylene copolymer, butadiene-styrene copolymer, polychloroprene, polyacrylic rubber, haver, guttapercha, polyethylene, polypropylene, polystyrene, polyvinyl chloride, polyvinyl acetate, polyacrylonitrile, polyester, polyamide and cellulose and the modified products thereof.

The impurities of a small amount to be dissolved and removed from the highly viscous solution by the method and apparatus of the present invention include polymerization catalysts, such as metals, metal compounds, acids, alkalis, sulfur-containing compounds, halogen-containing compounds and amine compounds, catalysts for modifying polymers, molecular weight regulators, randomizers, additives, impurities, unreacted modifiers, unreacted monomers and oligomers and the like.

The above described impurities are not only ones soluble in the low viscous solution but also involve ones which are soluble in the solvent of said solution or in the solute of said solution.

The embodiments for effecting the liquid-liquid extraction treatment by the method and apparatus of the present invention are the removal of Ziegler type catalyst by contacting a hydrocarbon solution of ethylene-propylene copolymer obtained by the copolymerization by means of said catalyst with water, the removal of metal compound by contacting a hydrocarbon solution of butadiene-styrene copolymer hydrogenated by a complex catalyst with an acidic aqueous solution, the removal of impurities of unreacted chlorine and the like by reacting a hydrocarbon solution of chlorinated butyl rubber with water or an aqueous alkali solution, the removal of the polymerization catalyst from liquid polyisobutene obtained by the cation polymerization, the removal of mercaptan by contacting a hydrocarbon solution of emulsion-polymerized styrene-butadiene rubber with an alkaline aqueous solution, the removal of styrene monomer and oligomer by contacting a hydrocarbon solution of butadiene-styrene copolymer with dimethylformamide and the like.

The present invention will be explained in more detail hereinafter.

For a better understanding of the invention, reference is taken to the accompanying drawings, wherein.

Figure 1:
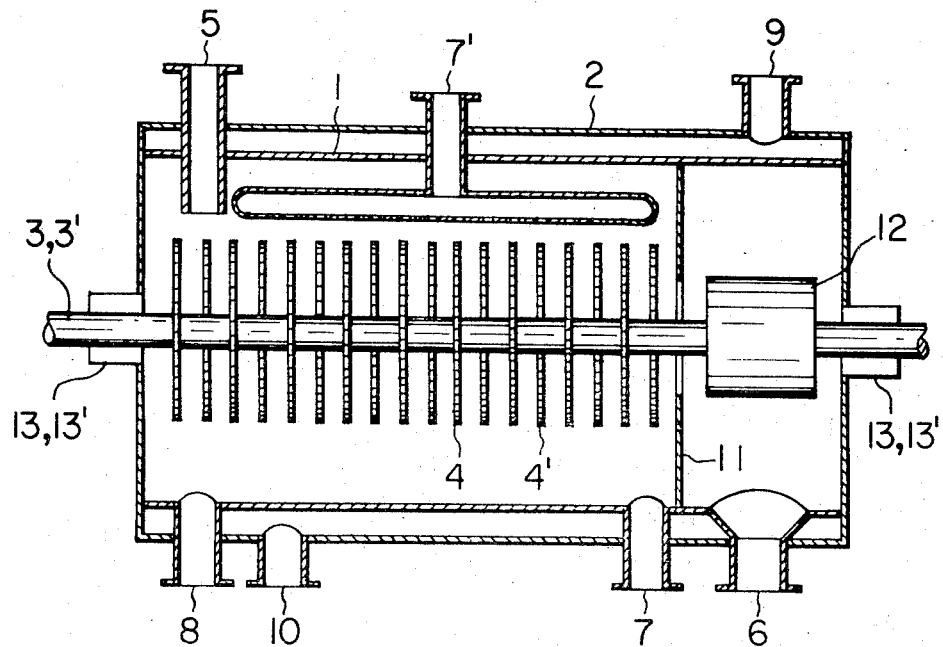
FIG. 1 is a longitudinal sectional view of an embodiment of apparatus of the present invention.
Figure 2:
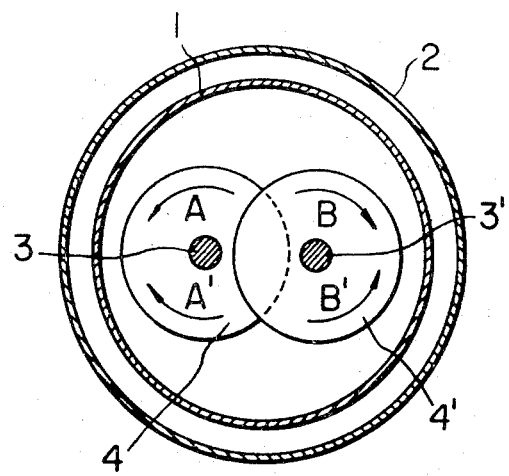
FIG. 2 is a transverse sectional view of the apparatus in FIG. 1.

Referring to FIGS. 1 and 2, 1 is a horizontal cylinder, which is surrounded by a jacket 2. Said cylinder 1 is provided with two rotary driving shafts 3 and 3' parallel to the longitudinal direction in the vicinity of the center, on each of which a plurality of rotary discs 4 and 4' are mounted respectively. The above described rotary driving shafts 3 and 3' are fixed by bearings 13 and 13' so that said rotary discs 4 and 4' do not come in contact but overlap with each other. Said cylinder 1 is provided with an inlet 5 and an outlet 6 for the highly viscous solution and inlets 7 and 7' and an outlet 8 for the low viscous solution. The jacket 2 is provided with an inlet 9 and an outlet 10 for the heating medium. Furthermore, the cylinder 1 is provided with a partition wall 11 having an opening around and near the center of the cylinder in the vicinity of the inside of the outlet 6 and the highly viscous solution taken out through the partition wall is fallen on a roll 12, by which said solution is discharged to the outlet 6.

The highly viscous solution supplied into the cylinder 1 through the inlet 5 is retained between the rotary discs rotating in the reverse direction as shown by arrows A and B or A' and B' in FIG. 2 and near the periphery of the discs and repeats the uniform diverging and converging without staying by a kind of selfcleaning function due to the reverse rotation of two driving shafts, whereby the low viscous solution supplied into the cylinder at an adequate rate through the inlets 7 and 7' is rolled up and incorporated into the highly viscous solution and dispersed uniformly in the highly viscous solution as finely divided drops by the shearing deformation and the fine drops are released at the free surface and the surface is renewed.

In such a manner the highly viscous solution is contacted with the low viscous solution and the highly viscous solution, in which the impurities of a small amount have been extracted with the low viscous solution, is moved towards the outlet 6 and is substantially separated from the low viscous solution by the partition wall 11 and then discharged through the outlet 6. The low viscous solution, by which the impurities of a small amount in the highly viscous solution have been extracted, is discharged through the outlet 8 while being controlled so as to maintain the proper liquid level of the low viscous solution. A screw may be provided in the outlet 6 depending upon the viscosity of the highly viscous solution, whereby said solution can be discharged without accumulating in the cylinder.

In the highly viscous solution treated with, for example, an acidic aqueous solution by means of the apparatus as shown in FIGS. 1 and 2 has been admixed and dispersed the acidic aqueous solution and therefore it is often inconvenient to supply such a highly viscous solution as such to the subsequent step and in such a case it is necessary to neutralize said solution by washing with water and other means. In this case the washing is also made by using the same method and apparatus as in the above described extraction operation.

Figure 3:
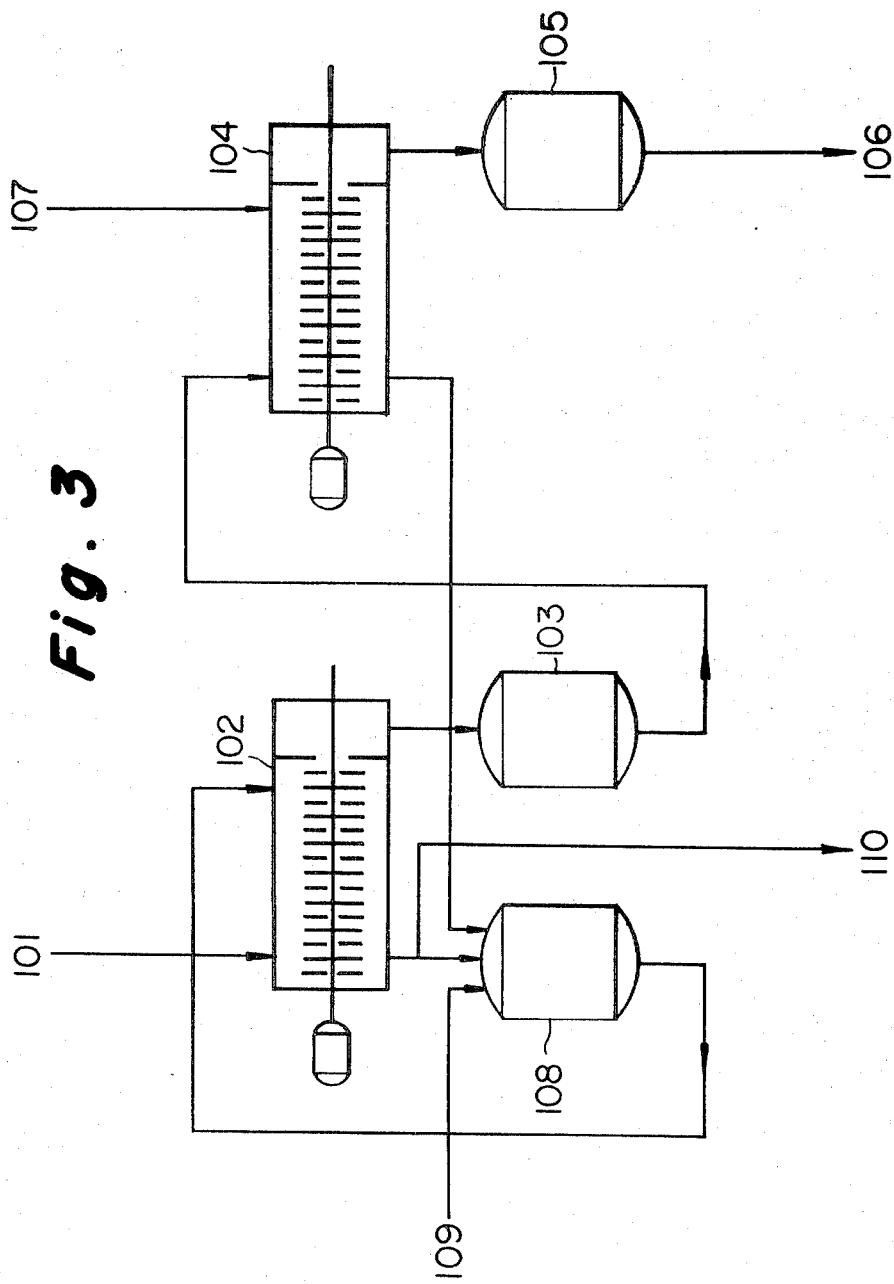
FIG. 3 is a flow diagram showing the apparatus of the continuous treatment of the present invention.

FIG. 3 shows a flow diagram wherein the impurities of a small amount in the high viscous solution are extracted and removed and then the extracting agent admixed in the highly viscous solution is washed by means of the apparatus of the present invention. The extracting tank 102 and the washing tank 104 are the above described apparatus of the present invention and have substantially the same structure. The highly viscous polymer solution containing a small amount of impurities is supplied continuously from the feed source 101 to the extracting tank 102 and the low viscous solution, for example, an acidic aqueous solution prepared by adding an acid from an acid feed source 109 at a preparing tank 108 is supplied to the extracting tank 102 continuously. At the extracting tank 102 the impurities are extracted as mentioned above and the above described low viscous solution which has dissolved the impurities is discharged from the extracting tank 102 and a part of said solution is taken out into a liquid reservoir 110 and the other part is returned to the above described preparing tank 108 and recycled. The highly viscous solution from which the impurities have been removed, is taken out from the extracting tank 102 and introduced into a separating tank 103, where any entrapped extracting agent is separated, and then introduced into a washing tank 104 continuously. At the same time, a washing liquid is fed into the washing tank 104 from a washing liquid feeding source 107 and contacted with the above described highly viscous solution to effect the washing treatment (the washing treatment to be carried out is substantially the same as the above described operation for removing the impurities). The washed liquid is discharged from the washing tank 104 and introduced into the above described preparing tank 108, where the washed liquid is used for the preparation of the extracting agent. The above described highly viscous solution after finished the washing is introduced into a separating tank 105, where an entrapped washing liquid is separated, and then taken out into a liquid reservoir 106. The acidity of the thus obtained highly viscous solution has been considerably reduced, which can be fed directly to the subsequent step.

The following examples are given for the purpose of illustration of this invention and are not intended as limitation thereof.

EXAMPLE 1

The apparatus as shown in FIGS. 1 and 2 is arranged by the constitution shown in FIG. 3, by which the liquid-liquid extraction of cobalt complex catalyst in hydrogenated butadiene-styrene rubber by means of a diluted sulfuric acid solution and the washing with water were effected.

As the rotary members, use was made of discs having a diameter of 200 mm. wherein four openings having a diameter of 30 mm. are perforated. 19 rotary discs were mounted per a rotary driving shaft at a distance of 50 mm. The available residence volume of the highly viscous solution retained between the rotary discs was about 30 l. and the liquid level of the diluted sulfuric acid solution was maintained near the center of the rotary driving shaft. Warm water at about 40° C. was flowed through the jacket.

15% by weight of hexane solution of hydrogenated butadiene-styrene rubber in which 50% of butadiene unit has been hydrogenated by means of 1,200 p.p.m. (cobalt weight/rubber weight) of cobalt complex catalyst soluble in hexane was fed into the extracting tank continuously at a rate of 30 l./1 hr. and 0.067 N of diluted sulfuric acid was fed simultaneously at a rate of 30 l./1 hr. and the rotary driving shafts were rotated at a rate of 80 r.p.m. at 40° C. to effect the liquid-liquid extraction. Said rubber solution after the cobalt catalyst was extracted, was introduced into the subsequent washing tank continuously at a rate of 30 l./1 hr. and at the same time water at 40° C. was introduced into the washing tank at a rate of 60 l./1 hr. and the driving shafts were rotated at a rate of 40 r.p.m. to effect the washing and to discharge the thus treated rubber solution continuously. The water drops dispersing in said discharged rubber solution had pH of 6.8 and the cobalt content in the recovered rubber was about 20 p.p.m. The apparent viscosity of the hydrogenated butadiene-styrene solution treated in this example at 40° C. was about 100 poises.

EXAMPLE 2

The neutralization and washing of chlorinated butadiene-styrene rubber were effected by the same apparatus and constitution as in Example 1. 5% by weight of hexane solution of chlorinated butadiene-styrene rubber in which 30% of butadiene unit has been selectively chlorinated was fed to the extracting tank continuously at a rate of 90 l./1 hr. and at the same time 0.5% by weight of aqueous solution of sodium carbonate was fed to the extracting tank at a rate of 90 l./1 hr. and the liquid-liquid extraction was effected at 40° C. and at a rotation rate of the rotary driving shafts of 80 r.p.m. The thus treated rubber solution was taken out from the extraction tank continuously and fed into the washing tank and at the same time water at 40° C. was fed into the washing tank at a rate of 60 l./1 hr. and the rotary driving shafts were rotated at a rate of 40 r.p.m. to effect the washing and to take out the thus treated rubber solution continuously. The chlorinated butadiene-styrene rubber prior to the neutralization and washing was added with pure water of the same amount as the rubber solution and the resulting mixture was thoroughly stirred for 30 minutes and left to stand and then the aqueous layer was separated. The separated aqueous layer had pH of 2.6.

The water drops dispersed in the rubber solution obtained in this example had pH of 6.8. The apparent viscosity of the chlorinated butadiene-styrene rubber treated in this example at 40° C. was about 40 poises.

What is claimed is:

1. A method for extracting a small amount of impurity contained in a highly viscous polymer solution with a liquid capable of extracting said impurity, which comprises charging continuously the highly viscous polymer solution having a viscosity of not less than 500 centipoises and containing a small amount of impurity and the liquid capable of extracting said impurity and having a viscosity of not more than 50 centipoises which causes a phase separation from said highly viscous polymer solution, said highly viscous polymer solution and said extracting liquid having a difference of specific gravity of 0 to 1.3, into a horizontal cylindrical treating vessel continuously, said horizontal vessel being provided with two rotary driving shafts parallel to the longitudinal direction of the horizontal vessel, on each of which a plurality of rotary members are mounted so that the rotary members on both the shafts are overlapped but do not come in contact with each other, rotating said rotary members in the reverse direction to stir the highly viscous polymer solution in the above extracting liquid so that the highly viscous polymer solution is immersed in the extracting liquid in such a liquid level that more than ⅓ of the highly viscous polymer solution is immersed in the extracting liquid while the highly viscous polymer solution being retained between the rotary members so as not substantially to come in contact with the inner wall of the treating vessel, contacting the highly viscous polymer solution with the extracting liquid while renewing the liquid-liquid surface to dissolve and extract the impurity in the highly viscous polymer solution into the extracting liquid and discharging the thus treated highly viscous polymer solution from the horizontal treating vessel continuously.

2. A method for extracting a small amount of impurity contained in a highly viscous polymer solution with a liquid capable of extracting said impurity which comprises charging the highly viscous polymer solution having a viscosity of not less than 500 centipoises and containing a small amount of impurity and the liquid capable of extracting said impurity and having a viscosity of not more than 50 centipoises, which causes a phase separation from said highly viscous solution, said highly viscous polymer solution and said extracting liquid having a difference of specific gravity of 0 to 1.3, into a horizontal cylindrical treating vessel continuously, said horizontal vessel being provided with two rotary driving shafts parallel to the longitudinal direction of the horizontal vessel, on each of which a plurality of rotary members are mounted so that the rotary members on both the shafts are overlapped but do not come in contact with each other, rotating the rotary members in the reverse direction to stir the highly viscous polymer solution while being retained between the rotary members so as not substantially to come in contact with the inner wall of the treating vessel, spraying the extracting liquid on the surface of the highly viscous polymer solution to dissolve and extract the small amount of impurity in the highly viscous solution into the extracting liquid and discharging the thus treated highly viscous solution from the horizontal treating vessel continuously.

References Cited

UNITED STATES PATENTS

| | | | |
|---|---|---|---|
| 3,074,921 | 1/1963 | Carter | 260—94.9 F |
| 3,254,048 | 5/1966 | Schaub et al. | 260—94.9 F |
| 2,758,915 | 8/1956 | Vodonik | 23—285 |
| 3,524,730 | 8/1970 | Yokouchi et al. | 23—285 |

PAUL M. COUGHLAN, JR., Primary Examiner

U.S. Cl. X.R.

23—270.5; 260—85.1, 96 R